United States Patent [19]

Brado et al.

[11] 4,206,065

[45] Jun. 3, 1980

[54] ELECTROSTATOGRAPHIC DEVELOPER COMPOSITIONS USING TERPOLYMER COATED CARRIER

[75] Inventors: James A. Brado, Buffalo; Louis H. Burrows, Rochester, both of N.Y.

[73] Assignee: Xerox Corporation, Stamford, Conn.

[21] Appl. No.: 956,122

[22] Filed: Oct. 30, 1978

[51] Int. Cl.$^2$ .......................... G03G 9/10; B32B 15/02

[52] U.S. Cl. .................................... 430/108; 430/111; 428/407; 260/42.14

[58] Field of Search ................... 252/62.1 P; 428/407; 260/42.14

[56] References Cited

U.S. PATENT DOCUMENTS

| | | | |
|---|---|---|---|
| 2,876,133 | 3/1959 | Iler et al. | 260/42.14 X |
| 3,133,893 | 5/1964 | Newman | 260/42.14 |
| 3,305,498 | 2/1967 | Herman et al. | 260/42.14 X |
| 3,364,186 | 1/1968 | Wilhelm et al. | 260/42.14 X |
| 3,519,593 | 7/1970 | Bolger | 260/42.14 |
| 3,669,885 | 6/1972 | Wright et al. | 252/62.1 P |
| 3,676,350 | 7/1972 | Wright et al. | 252/62.1 P |
| 3,906,088 | 9/1975 | Trichot | 428/407 X |
| 3,916,065 | 10/1975 | Moriconi et al. | 252/62.1 P X |

OTHER PUBLICATIONS

"Electrographic Carrier Vehicle and Developer Composition," Res. Discl., Prod. Lic. Index, Aug., 1972, pp. 59-60.

*Primary Examiner*—Roland E. Martin, Jr.

[57] ABSTRACT

Electrostatographic developer mixtures comprising finely-divided toner particles electrostatically clinging to the surface of carrier particles comprising a core having an outer coating thereon selected from terpolymers of vinyl chloride/vinyl acetate/vinyl alcohol and vinyl chloride/vinyl acetate/dibasic acid. The coated carrier particles have negative triboelectric charging properties and are particularly useful in reversal development systems. Imaging processes are also disclosed.

9 Claims, No Drawings

ELECTROSTATOGRAPHIC DEVELOPER COMPOSITIONS USING TERPOLYMER COATED CARRIER

BACKGROUND OF THE INVENTION

This invention relates to electrostatographic imaging systems and more specifically to improved carrier compositions useful in the development of electrophotographic images.

It is well known to form and develop images on the surface of photoconductive materials by electrostatic means, one of the more basic systems being described in C. F. Carlson U.S. Pat. No. 2,297,691. This process is also described in other U.S. patents including, for example, U.S. Pat. No. 2,227,013; U.S. Pat. No. 2,357,809; U.S. Pat. No. 2,551,582; U.S. Pat. No. 3,220,324 and U.S. Pat. No. 3,220,833. The processes described in these patents generally involve the forming of an electrostatic charge latent image on an insulating electrophotographic element whereby the latent image is made visible by a development step wherein the charged surface of the photoconductive element is brought into contact with a suitable developer mix. As described in U.S. Pat. No. 2,297,691, for example, the resulting electrostatic latent image is developed by depositing on the image a finely-divided electroscopic material referred to in the art as toner. This toner is generally attracted to the areas of the layer which retain a charge, thereby forming a toner image corresponding to the electrostatic latent image and subsequently the toner image can be transferred to a support surface such as paper. This transferred image can then be permanently fixed to the support surface by using a variety of techniques including heat; however, other suitable fixing methods such as solvent or overcoating treatment may be used.

Numerous methods are known for applying the electroscopic particles to the electrostatic latent image including cascade development, touchdown and magnetic brush belt. In cascade development, as described in U.S. Pat. No. 2,618,552, a developer material comprising relatively large carrier particles having finely-divided toner particles electrostatically clinging to the surface of the carrier particles is conveyed to and rolled or cascaded across the electrostatic latent image-bearing surface. The composition of the toner particles is selected in order to have a triboelectric polarity opposite to that of the carrier particles. Thus, as the mixture cascades or rolls across the image-bearing surface, the toner particles are electrostatically deposited and secured to the charged portion of the latent image and are not deposited on the uncharged or background portions of the image. Carrier particles and unused toner particles can then be recycled. This process is fully described by E. N. Wise in U.S. Pat. No. 2,618,552.

In magnetic brush development, a developer material comprising toner and magnetic carrier particles is carried by a magnet whereby the magnetic field of the magnet causes alignment of the magnetic carriers in a brush-like configuration, and this brush is engaged with an electrostatic latent image-bearing surface, causing the toner particles to be attracted from the brush to the electrostatic latent image by electrostatic attraction. This process is described more fully in U.S. Pat. No. 2,874,063.

Some recent efforts to improve copy quality have focused on the carrier particles, and more specifically the coating of those particles in order to obtain a better development system, particularly a developer that can be recycled and does not cause injury to the photoconductor. The importance of carrier coating compositions takes an increased emphasis in different development techniques. Generally, in order to develop a latent image comprised of negative electrostatic charges, an electroscopic powder and carrier combination is selected in which the toner powder is triboelectrically positive relative to the granular carrier. To develop a latent image comprised of positive electrostatic charges such as when employing a selenium photoreceptor, an electroscopic powder and carrier mixture is selected in which the powder is triboelectrically negative relative to the carrier. However, where the latent image is formed of negative electrostatic charges, such as when employing organic electrophotosensitive materials as the photoreceptor, it is desirable to develop the latent image with a positively charged electroscopic powder and a negatively charged carrier material. Thus, there is a continuing need for a better developer material for developing electrostatic latent images.

SUMMARY OF THE INVENTION

It is therefore, an object of this invention to provide developer materials which overcome the above-noted deficiencies.

It is another object of this invention to provide carrier materials which have excellent adherence to carrier substrates.

It is a further object of this invention to provide carrier coatings which are more resistant to cracking, chipping, flaking, and have high tensile and compressive strength.

It is a further object of this invention to provide coated carrier materials having negative triboelectric charging characteristics, greatly increased life, better flowability properties, and which materials can be reclaimed if desired.

Furthermore, it is an object of this invention to provide improved developer materials, especially improved coated carrier materials which may be used in an electrostatographic development environment where the photoreceptor is negatively charged.

It is yet another object of this invention to provide improved coated carrier materials having physical and electrical properties superior to those of known developer materials, especially with regard to utilization in a reversal development technique.

The above objects and others are accomplished, generally speaking, by providing carrier compositions for electrostatographic developer mixtures comprising finely-divided toner particles electrostatically clinging to the surface of carrier particles wherein said carrier particles comprise a core having an outer coating thereon selected from the group consisting of terpolymers of vinyl chloride-vinyl acetate-vinyl alcohol and vinyl chloride-vinyl acetate-dibasic acid. The aforedescribed terpolymers provide coated electrostatographic carrier particles which can be advantageously used in an electrostatographic development system where development of a negatively charged photoreceptor is desired. In accordance with this invention, it has been found that the carrier coating materials of this invention provide electrostatographic coated carrier materials which possess desirable negative triboelectric charging properties, copy print quality, and life performance superior to known coated carrier particles, especially carrier particles coated with other halogenated polymers.

When employing the chlorinated terpolymer coating compositions of this invention on electrostatographic carrier particles, it has been found that the thus coated carrier particles possess vastly improved life performance characteristics over known chlorinated polymer coating materials. Although not wishing to be bound by an explanation therefor, it is believed that the improved life performance characteristics of the carrier compositions of this invention are due to the presence of the third component in the terpolymer compositions herein, i.e., vinyl alcohol and dibasic acid, providing improved adhesion and physical stability to the chlorinated coating materials. Such improved life performance characteristics of the carrier materials is especially notable when these terpolymers are applied to metallic carrier cores, since typically, chlorinated resins applied to metallic carrier cores are unstable as evidenced by short carrier life more fully shown in the working examples herein. In addition, the chlorinated terpolymer coating compositions of this invention have been found to provide an especially desirable and useful range of triboelectric charging properties to the carrier materials when employed in developer mixtures for the development of electrostatic latent images formed of negative charges. That is, the higher range of triboelectric charging values of these terpolymer coated carrier particles is significantly superior to those obtained with other chlorinated compositions and results in improved performance in the development of negatively charged latent images.

The chlorinated terpolymer carrier coating compositions of this invention are available commercially from Union Carbide Corporation, Boundbrook, N.J., under tradenames such as Bakelite® VAGH and VAGD, which are 91/3/6 weight ratios of vinyl chloride/vinyl acetate/vinyl alcohol compositions in a matrix of butylene dimethacrylate; Bakelite® VMCH, which is an 86/13/1 weight ratio composition of vinyl chloride/vinyl acetate/dibasic acid; Bakelite® VMCC, which is an 83/16/1 weight ratio composition of vinyl chloride/vinyl acetate/dibasic acid; and Bakelite® VMCA, which is an 81/17/2 weight ratio composition of vinyl chloride/vinyl acetate/dibasic acid.

Any suitable ratio of vinyl chloride to vinyl acetate to vinyl alcohol or dibasic acid may be employed in the terpolymers of this invention. Perferred ratios of vinyl chloride are in the amount of between 81 and 91 parts to 3 to 17 parts of vinyl acetate and 1 to 6 parts of vinyl alcohol or dibasic acid because the coated carrier particles charge more rapidly to high negative triboelectric values with respect to commercial toner particles, the coating has good mechanical properties and adhesion to carrier cores, especially steel and ferrite core; and unlike most halogenated polymers which must be applied from suspensions and fused at high temperatures, these terpolymers are soluble in common solvents and form substantially continuous films on the carrier cores at relatively low temperatures. In addition, since a high temperature post fuse is not required, successive layers of the terpolymers can be applied from solution. Further, these terpolymers have higher impact strength than homopolymers and copolymers of vinyl chloride.

Any suitable terpolymer coating weight may be employed to coat the carrier cores. However, a coating having a thickness at least sufficient to form a substantially continuous film is preferred because the carrier coating will then possess sufficient thickness to resist abrasion and minimize pinholes which may adversely affect the triboelectric properties of the coated carrier particles, and the desired triboelectric effect to the carrier will be obtained to maintain a sufficient negative charge on the carrier wherein the toner is charged positively in such an embodiment so as to allow development of negatively charged images to occur. Generally, for cascade and magnetic brush development, the terpolymer carrier coating may comprise from about 0.1 percent to about 2.5 percent by weight based on the weight of the coated carrier particle. Preferably, the coating should comprise from about 0.3 percent to about 0.9 percent by weight based on the weight of the coated particle because maximum coating durability, toner impaction resistance, and copy quality are achieved. To achieve further variation in the properties of the final coated product, well-known additives such as plasticizers, reactive or non-reactive resins, dyes, pigments, conductive fillers, wetting agents and mixtures thereof may be mixed with the terpolymers.

Any suitable well-known coated or uncoated carrier materials may be employed as the substrate for the carriers of this invention. Typical carrier core materials include granular zircon, granular silicon, methyl methacrylate, glass, silicon dioxide, flintshot, iron, steel, ferrite, nickel, and mixtures thereof. Many of the foregoing and other typical carrier materials are described by L. E. Walkup in U.S. Pat. No. 2,618,551; L. E. Walkup et al in U.S. Pat. No. 2,638,416; E. N. Wise in U.S. Pat. No. 2,618,552; and C. R. Mayo in U.S. Pat. Nos. 2,805,847 and 3,245,823. An ultimate coated carrier particle having an average diameter between about 30 microns to about 1,000 microns is preferred because the carrier particle then possesses sufficient density and inertia to avoid adherence to the electrostatic images during the development process. Adherence of carrier beads to an electrostatographic drum is undesirable because of the formation of deep scratches on the drum surface during the image transfer and drum cleaning steps, particularly where cleaning is accomplished by a web cleaner such as the web disclosed by W. P. Graff, Jr. et al in U.S. Pat. No. 3,186,838.

Any suitable finely-divided toner material may be employed with the coated carriers of this invention. Typical toner materials include gum copal, gum sandarac, rosin, cumaroneindene resin, asphaltum, gilsonite, phenolformaldehyde resins, rosin-modified phenolformaldehyde resins, methacrylic resins, polystyrene resins, epoxy resins, polyester resins, polyethylene resins and mixtures thereof. The particular toner material to be employed obviously depends upon the separation of the toner particles from the coated carrier beads in the triboelectric series. Among the patents describing electroscopic toner compositions are U.S. Pat. No. 2,659,670 to Copley; U.S. Pat. No. 2,753,308 to Landrigan; U.S. Pat. No. 3,079,342 to Insalaco; U.S. Pat. No. Re. 25,136 to Carlson and U.S. Pat. No. 2,788,288 to Rheinfrank et al. These toners generally have an average particle diameter between about 5 and 15 microns. A particularly preferred toner composition is one comprising a styrene-n-butyl methacrylate copolymer and a furnace carbon black wherein the toner composition has been classified as to have a particle volume median diameter of about 13.5±1.5 microns.

Any suitable pigment or dye may be employed as the colorant for the toner particles. Toner colorants are well known and include, for example, carbon black, nigrosine dye, aniline blue, Calco Oil Blue, chrome yellow, ultramarine blue, Quinoline Yellow, methylene blue chloride, Monastral Blue, Malachite Green Oxalate, lampblack, Rose Bengal, Monastral Red, Sudan Black BN, and mixtures thereof. The pigment or dye should be present in the toner in a sufficient quantity to render it highly colored so that it will form a clearly visible image on a recording member.

Any suitable conventional toner concentration may be employed with the coated carriers of this invention. Typical toner concentrations include about 1 part toner with about 10 to 200 parts by weight of carrier.

Any suitable well-known electrophotosensitive material may be employed as the photoreceptor with the coated carriers of this invention. Well-known photoconductive materials include vitreous selenium, organic or inorganic photoconductors embedded in a non-photoconductive matrix, organic or inorganic photoconductors embedded in a photoconductive matrix, or the like. Representative patents in which photoconductive materials are disclosed include U.S. Pat. No. 2,803,542 to Ullrich; U.S. Pat. No. 2,970,906 to Bixby; U.S. Pat. No. 3,121,006 to Middleton; U.S. Pat. No. 3,121,007 to Middleton; and U.S. Pat. No. 3,151,982 to Corrsin.

Any suitable method may be employed to apply the terpolymer coating materials of this invention to electrostatographic carrier cores. Typical methods include mixing, dipping, or spraying carrier cores with a solution or dispersion of the coating material employing a vibratub or fluidized bed.

In the following examples, the relative triboelectric values generated by contact of carrier beads with toner particles is measured by means of a Faraday Cage. The device comprises a brass cylinder having a diameter of about 1 inch to a length of about 1 inch. A 325 mesh screen is positioned at each end of the cylinder. The cylinder is weighed, charged with about a 0.5 gram mixture of carrier and toner particles and connected in parallel. Dry compressed air is then blown through the brass cylinder to drive all the toner from the carrier. The charge on the capacitor is then read on the electrometer. Next, the chamber is reweighed to determine the weight loss. The resulting data is used to calculate the toner concentration and the charge in microcoulombs per gram of toner. Since the triboelectric measurements are relative, the measurements should, for comparative purposes, be conducted under substantially identical conditions. Thus, a toner comprising a styrene-n-butyl methacrylate copolymer and furnace carbon black is used as a contact triboelectrification standard in the examples. Obviously, other suitable toners such as those listed above may be substituted for the toner used in the examples.

DESCRIPTION OF PREFERRED EMBODIMENTS

The following examples, other than the control examples, further define, describe and compare preferred methods of utilizing the carrier materials of the present invention in electrostatographic applications. Parts and percentages are by weight unless otherwise indicated.

EXAMPLE I

A developer mixture was prepared by applying a coating solution containing about 10 percent solids comprising a copolymer of about 88 parts vinyl chloride and about 12 parts vinyl acetate (VYLF, available from Union Carbide Corporation, Boundbrook, N.J.) dissolved in methyl isobutyl ketone and toluene to steel carriers particles having an average particle diameter of about 450 microns. The carrier cores were heated to about 80° C. and the coating solution was added to a water-jacketed vibratub coating apparatus available from Vibraslide Inc., Binghamton, N.Y. The coating solution was applied to provide about 0.4 percent of weight of the coating material based on the weight of the coated cores. After removal of the solvent, the coated cores were mixed with a toner material comprising a styrene-n-butyl methacrylate copolymer and a furnace carbon black wherein the toner material has an average particle size of between about 10 and 15 microns. The coated cores were blended with the toner material in an amount of about 0.5 part toner material per about 100 parts of carrier material. The developer mixture was roll-milled for about 10 minutes, ½ hour, and 3 hours, after which times the triboelectric charge generated on the carrier particles was measured as indicated above. The triboelectric values found were as follows:

| Roll-Milling Time | Triboelectric Charge (micro-coulombs/gram toner) |
|---|---|
| 10 minutes | =0.2 |
| ½hour | +0.3 |
| 3 hours | −0.3 |

Thus, it was found that this carrier and toner mixture provided a carrier with very low negative triboelectric charging values unsatisfactory for good print quality.

EXAMPLE II

A developer mixture was prepared by applying a coating solution containing about 10 percent solids comprising a copolymer of vinyl chloride and acrylonitrile (Saran F-310, available from Dow Chemical Company, Midland, Mich.) dissolved in 90 parts of methyl ethyl ketone and 10 parts of toluene to steel carrier particles having an average particle diameter of about 450 microns. The carrier cores were heated to about 90° C. and the coating solution was added to a water-jacketed vibratub apparatus as in Example I. The coating solution was applied to provide about 0.4 percent by weight of the coating material based on the weight of the coated cores. After removal of the solvent, the coated cores were mixed with a toner material comprising a styrene-n-butyl methacrylate copolymer and a furnace carbon black wherein the toner material has an average particle size of between about 10 to 15 microns. The coated cores were blended with the toner material in an amount of about 0.5 part toner material per about 100 parts of carrier material. The developer mixture was roll-milled for about 10 minutes, ½ hour, and 3 hours, after which times the triboelectric charge generated on the carrier particles was measured as indicated above. The triboelectric values found were as follows:

| Roll-Milling Time | Triboelectric Charge (micro-coulombs/gram toner) |
|---|---|
| 10 minutes | −4.6 |
| ½ hour | −3.6 |
| 3 hours | −0.4 |

It was found that this carrier and toner mixture provides a carrier with low negative triboelectric charging values which are unsatisfactory for good print quality.

EXAMPLE III

A developer mixture was prepared by applying a coating solution containing about 10 percent solids comprising chlorinated polypropylene (Parlon P-10, available from Hercules Powder Co., Wilmington, Del.) dissolved in tetrahydrofuran to steel carrier particles having an average particle diameter of about 250 microns. The carrier cores and the coating solution were simultaneously heated and suspended in a water-jacketed vibratub coating apparatus as in Example I. The coating solution was applied to provide about 0.3 percent by weight of the coating material based on the weight of the coated cores. After removal of the solvent, the coated cores were mixed with a toner material comprising a styrene-n-butyl methacrylate copolymer and a furnace carbon black wherein the toner material has an average particle size of between about 10 to 15 microns. The coated cores were blended with the toner material in an amount of about 0.5 part toner material per about 100 parts of carrier material. The developer mixture was roll-milled for about ½ hour, after which time the triboelectric charge generated on the carrier particles was measured as indicated above. The triboelectric value found was about −8.4 micro-coulombs per gram of toner. When employed to make copies of an original, some developer deposit was found in image background areas and some toner particles found on the recording surface were of the wrong polarity.

EXAMPLE IV

A developer mixture was prepared by applying a coating solution containing about 10 percent solids comprising a 91/3/6 weight ratio terpolymer of vinyl chloride/vinyl acetate/vinyl alcohol in butylene dimethacrylate matrix (VAGH, available from Union Carbide Corporation, Boundbrook, N.J.) dissolved in equal parts by toluene and methyl isobutyl ketone to glass carrier cores having an average particle diameter of about 600 microns. The coating solution was heated at about 90° C. for about 5 minutes and then added to the carrier cores and heated to dryness in a water-jacketed vibratub coating apparatus as in Example I. The coating solution was applied to provide about 1.0 percent by weight of the coating material based on the weight of the coated cores. After removal of the solvent, the coated cores were mixed with a toner material comprising a styrene-n-butyl methacrylate copolymer and a furnace carbon black wherein the toner material has an average particle size of between about 10 to 15 microns. The coated cores were blended with the toner material in an amount of about 1 part toner material per about 100 parts of carrier material. The developer mixture was roll-milled for about 1 hour, after which time the triboelectric charge generated on the carrier particles was measured as indicated above. The triboelectric value found was about −11.1 micro-coulombs per gram of toner. When employed to make copies of an original, the prints obtained had good solid area development, print density, and image resolution.

EXAMPLE V

A developer mixture was prepared by applying a coating solution containing about 10 percent solids comprising a 86/13/1 weight ratio terpolymer of vinyl/chloride/vinyl acetate/dibasic acid (VMCH-B-310, available from Union Carbide Corporation, Boundbrook, N.J.) dissolved in equal parts of toluene and methyl isobutyl ketone to ferrite carrier cores having an average particle diameter of about 100 microns. The carrier cores were heated to about 70° C. and the coating solution was heated to about 45° C. and then added to the carrier cores and heated to dryness in a water-jacketed vibratub coating apparatus as in Example I. The coating solution was applied to provide about 0.7 percent by weight of the coating material based on the weight of the coated cores. After removal of the solvent, the coated cores were mixed with a toner material comprising a styrene-n-butyl methacrylate copolymer and a furnace carbon black wherein the toner material has an average particle size of between about 10 to 15 microns. The coated cores were blended with the toner material in an amount of about 1 part toner material per about 100 parts of carrier material. The developer mixture was roll-milled for about 10 minutes and 30 minutes, after which times the triboelectric charge generated on the carrier particles was measured as indicated above. The triboelectric values found were about −21.3 and −16.5 micro-coulombs, respectively, per gram of toner. When employed to make copies, the prints obtained had excellent solid area development, print density, and image resolution.

EXAMPLE VI

A developer mixture was prepared by applying a coating solution containing about 10 percent solids comprising a 86/13/1 weight ratio terpolymer of vinyl chloride/vinyl acetate/dibasic acid (VMCH-B-590, available from Union Carbide Corporation, Boundbrook, N.J.) dissolved in equal parts of toluene and methyl isobutyl ketone to steel carrier cores having an average particle diameter of about 250 microns. The carrier cores were heated to about 80° C. and the coating solution was heated to about 45° C. and then added to the carrier cores and heated to dryness in a water-jacketed vibratub coating apparatus as in Example I. The coating solution was applied to provide about 0.4 percent by weight of the coating material based on the weight of the coated cores. After removal of the solvent, the coated cores were mixed with a toner material comprising a styrene-n-butyl methacrylate copolymer and a furnace carbon black wherein the toner material has an average particle size of between about 10 to 15 microns. The coated cores were blended with the toner material in an amount of about 1 part toner material per about 100 parts of carrier material. The developer mixture was roll-milled for about 10 minutes, ½ hour, and 3 hours, after which times the triboelectric charge generated on the carrier particles was measured as indicated above. The triboelectric values found were as follows:

| Roll-Milling Time | Triboelectric Charge (micro-coulombs/gram toner) |
|---|---|
| 10 minutes | −24.8 |
| ½ hour | −28.1 |
| 3 hours | −26.6 |

When employed to make copies, the prints obtained had excellent solid area development, print density, and image resolution.

EXAMPLE VII

A developer mixture was prepared by applying a coating solution containing about 10 percent solids comprising a 86/13/1 weight ratio terpolymer of vinyl chloride/vinyl acetate/dibasic acid (VMCH-310, available from Union Carbide Corporation, Boundbrook, N.J.) dissolved in equal parts of toluene and methyl isobutyl ketone to steel carrier cores having an average particle diameter of about 100 microns. The carrier cores were heated to about 70° C. and the coating solution was heated to about 45° C. and then added to the carrier cores and heated to dryness in a water-jacketed vibratub coating apparatus as in Example I. The coating solution was applied to provide about 0.4 percent by weight of the coating material based on the weight of the coated cores. After removal of the solvent, the coated cores were mixed with a toner material comprising a styrene-n-butyl methacrylate copolymer and a furnace carbon black wherein the toner material has an average particle size of between about 10 to 15 microns. The coated cores were blended with the toner material in an amount of about 1 part toner material per about 100 parts of carrier material. The developer mixture was roll-milled for about 10 minutes, ½ hour, and 3 hours, after which times the triboelectric charge generated on the carrier particles was measured as indicated above. The triboelectric values found were as follows:

| Roll-Milling Time | Triboelectric Charge (micro-coulombs/gram toner) |
|---|---|
| 10 minutes | −15.1 |
| ½ hour | −13.8 |
| 3 hours | −11.7 |

When employed to make copies, the prints obtained had excellent solid area development, print density, and image resolution. In addition, this developer mixture was successfully machine tested to 300,000 copies.

Under identical coating abrasion test conditions of 15 minutes duration, it was found that the foregoing coating solution applied to steel carrier cores having an average particle diameter of about 450 microns experienced a coating loss of about 0.6 percent by weight compared to a coating loss of about 1.6 percent by weight for the carrier material of Example I.

Although specific materials and conditions were set forth in the above exemplary process in making and using the developer materials of this invention, these are merely intended as illustrations of the present invention. Various other toners, carrier cores, substituents and processes such as those listed above may be substituted for those in the examples with similar results.

Other modifications of the present invention will occur to those skilled in the art upon a reading of the present disclosure. These are intended to be included with the scope of this invention.

What is claimed is:

1. A carrier particle for electrostatographic developer mixtures, said carrier particle comprising a core having an average diameter of from between about 30 microns and about 1,000 microns, said core having an outer coating comprising a terpolymer selected from the group consisting of vinyl chloride/vinyl acetate/vinyl alcohol and vinyl chloride/vinyl acetate/dibasic acid.

2. A carrier particle for electrostatographic developer mixtures in accordance with claim 1 wherein said terpolymer comprises vinyl chloride/vinyl acetate/vinyl alcohol.

3. A carrier particle for electrostatographic developer mixtures in accordance with claim 1 wherein said terpolymer comprises vinyl chloride/vinyl acetate/-dibasic acid.

4. A carrier particle for electrostatographic developer mixtures in accordance with claim 1 wherein said terpolymer contains from between about 81 and about 91 parts by weight of vinyl chloride based on the weight of said terpolymer.

5. A carrier particle for electrostatographic developer mixtures in accordance with claim 1 wherein said terpolymer contains from between about 3 and about 17 parts by weight of vinyl acetate based on the weight of said terpolymer.

6. A carrier particle for electrostatographic developer mixtures in accordance with claim 1 wherein said terpolymer contains from between about 1 and about 6 parts by weight of vinyl alcohol or dibasic acid based on the weight of said terpolymer.

7. A carrier particle for electrostatographic developer mixtures in accordance with claim 1 wherein said outer coating is present in an amount of from between about 0.1 percent and about 2.5 percent by weight based on the weight of said carrier particles.

8. A carrier particle for electrostatographic developer mixtures in accordance with claim 1 wherein said core comprises a ferromagnetic material selected from the group consisting of iron, steel, ferrite and nickel.

9. An electrostatographic developer mixture comprising finely-divided toner particles electrostatically clinging to the surface of carrier particles, said carrier particles comprising a core having an average diameter of from between about 30 microns and about 1,000 microns, said core having an outer coating comprising a terpolymer selected from the group consisting of vinyl chloride/vinyl acetate/vinyl alcohol and vinyl chloride/vinyl acetate/dibasic acid.

* * * * *